Sept. 13, 1966           D. A. NISULA           3,272,549

MATERIALS HANDLING DEVICE

Filed Jan. 13, 1965           2 Sheets-Sheet 1

INVENTOR.
DAVID A. NISULA
BY Robert T. Casey
ATTORNEY

Sept. 13, 1966 D. A. NISULA 3,272,549
MATERIALS HANDLING DEVICE
Filed Jan. 13, 1965 2 Sheets-Sheet 2

INVENTOR.
DAVID A. NISULA
BY Robert H. Casey
ATTORNEY

United States Patent Office 3,272,549
Patented Sept. 13, 1966

3,272,549
MATERIALS HANDLING DEVICE
David A. Nisula, Simsbury, Conn., assignor to General Electric Company, a corporation of New York
Filed Jan. 13, 1965, Ser. No. 425,190
11 Claims. (Cl. 294—64)

This invention relates to a materials handling apparatus and more particularly is directed to a vacuum actuated device for lifting and transferring sheet material.

Devices of this general type have many applications in industry. For example, large stacks of sheet material such as plastic or metal may be deposited in a chosen manufacturing location and the device of the present invention positioned by appropriate apparatus can be employed to engage and pick up individual sheets one at a time means of its resilient vacuum actuated cup and transfer the sheets to a desired position depositing each sheet by release of the vacuum within the cup. In a similar manner the device of the present invention may be employed to feed sheet materials to a conveyor means, or an automatic or semi-automatic device such as a shearing machine. Materials handling devices of this general type are operatively dependent upon the vacuum created within a resilient cup-like means to hold the material fast while it is being lifted and transferred to another location or position. In many uses a materials handling device of the vacuum actuated type is required to transfer sheet materials laterally as well as upwardly and downwardly.

While devices of this type have generally been found very satisfactory for lifting operations, some difficulties have been encountered when materials are moved laterally. Because of the suction of the vacuum cup, sheet material will be held firmly in place when it is moved upward and downward. However, when sheet materials are sought to be moved laterally by a vacuum actuated materials handling device, it has been found that the inertia of the material itself tends to cause the vacuum device to slide across the material and in some instances lose its vacuum so that the material is dropped. This difficulty becomes pronounced where the sheet material being transferred has a smooth surface and the tendency of the material to allow the vacuum cup to slide across its surface is even more pronounced in handling metal sheet material which has a light protective film of oil or similar coating on its surface which acts like a lubricant between the vacuum actuated cup and the surface of the sheet material.

Prior art material handling devices of the vacuum actuated type have employed several expedients to overcome these difficulties of handling and transferring materials by rapidly accelerated and decelerated lateral movements. Some prior art vacuum actuated devices have employed multiple rows of ribs on the under surface of the vacuum cup to provide additional gripping means while other prior art devices have employed slip resistant abrasive surfaces on the underside of the vacuum cup to prevent undesirable slipping of the materials while they are being handled and transferred. Additional ribs and other similar configurations on the underside of the vacuum cup are capable of adding to the gripping of such a vacuum actuated device but they are not entirely effective in cases where sheet material is sought to be transferred by rapidly accelerating and decelerating lateral movement, especially when the materials are coated with a film of protective oil or similar coating which acts as a lubricant between the vacuum actuated device and the material itself. The use of an abrasive surface on the underside of a vacuum cup adds considerably to its ability to retain sheet materials being transferred by lateral movement but has the disadvantage that the abrasive material may scratch, deface or mar the surface especially when employed to handle softer materials such as some types of aluminum, for instance.

Accordingly, it is the primary object of the present invention to provide a vacuum actuated materials handling device which is especially adapted to transfer materials laterally by rapidly accelerating and decelerating movement.

Another object of the present invention is to provide such a device which overcomes the disadvantages of prior art materials handling devices.

Yet another object of the present invention is to provide a vacuum actuated materials handling device including adjustable means which is selectively positionable in accordance with the type, size and surface of the sheet materials to be handled.

The invention in one form comprises a resilient cup member having an aperture and means adapted to connect the aperture to an evacuating means. Within the cup there is positioned at least one pointed rigidly depending member which is so disposed that its point will engage sheet material held to the cup by atmospheric pressure upon evacuation of the cup. In its simplest form the pointed member may be included in the sheet materials handling device of the present invention by being threaded and screwed into the previously mentioned aperture which is provided with matching threads to receive the pointed member. Such a pointed member has at least one and preferably several orifices therethrough which may take the form of grooved or fluted sections of its threaded surface, thus affording communication between the underside of the cup and the evacuating means to which the sheet materials handling device is connected. Additionally, the arrangement of internal threads on the aperture and an externally threaded pointed member received therein, provides a means of positioning the pointed member upwardly or downwardly in accordance with the size, type and weight of material which is to be transferred by use of the materials handling device.

Additional objects and aspects of the invention will be more fully understood from the following description and the accompanying drawings and its scope will be pointed out in the appended claims.

Figure 1:
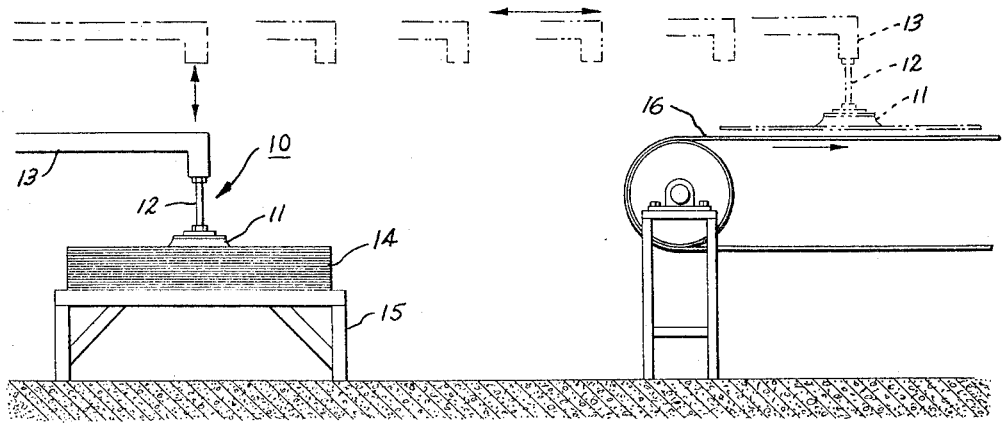
FIGURE 1 is an illustration of materials handling apparatus which may employ the present invention.

FIGURE 1 illustrates a materials handling apparatus shown generally at 10 which is movable both upwardly and downwardly as well as laterally. A vacuum actuated member 11 is connected to evacuating means 12 which in turn is supported by a movable and positionable member 13. In operation the materials handling apparatus lowers the vacuum operated member into contact with the top piece of a stack of sheet material 14 positioned in a manufacturing area on an appropriate support 15. The evacuating means creates a vacuum within the vacuum actuated member 11 drawing the top piece of sheet material into close contact by reason of the difference of pressure between the bottom side and the top side lying under the vacuum actuated member. When the movable member is lifted to the position shown by dash lines, the top sheet of material is lifted by suction and thus may be transferred laterally through the several positions indicated by the dash line outline of the movable member to the position at the far right of FIGURE 1 and directly over a conveyor belt 16. At this point the vacuum is relieved and the sheet of material drops by gravity to the surface of the conveyor belt 16 to be transferred to another manufacturing station as desired. The lateral movement of materials as illustrated in FIGURE 1 may be most markedly improved by employment of the vacuum-actuated device of the present invention.

Figure 2:
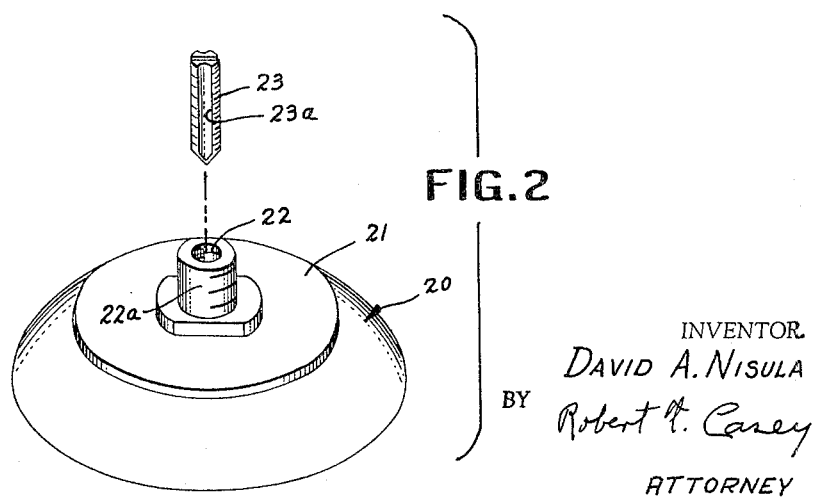
FIGURE 2 is a perspective view of one embodiment of the present invention.

Referring now to FIGURE 2 there is shown an embodiment of the present invention in perspective view which comprises a resilient cup member shown generally at 20 secured to a rigid base member 21, the two members being arranged in concentric disposition. The rigid base member 21 has an aperture therein at 22 which also extends through the resilient cup member 20. The internal surface of the aperture 22 is threaded to receive an externally threaded member 23 which is pointed at its bottom and adjustably positionable in the aperture 22 for its point to engage sheet metal held to the cup by evacuation under the cup as will be explained more fully hereinafter.

Figure 3:
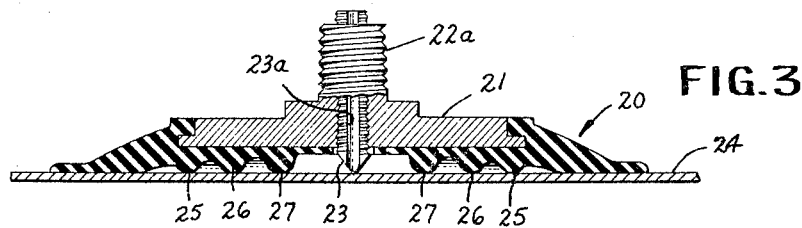
FIGURE 3 is a cross-sectional view of the illustration of FIGURE 1.

In order for the underside of the cup 20 to be evacuated, the threaded pointed member 23 is grooved as shown at 23a to provide a through communication along the sides of the aperture 22 for connecting an evacuating means with the underside of the resilient cup member 20. The embodiment of FIGURE 2 will be more fully understood by reference to FIGURE 3 wherein the same members are identified by the same numerical designations as in FIGURE 2. In FIGURE 3 it can be seen that the rigid base member 21 is secured to the resilient cup member 20 by appropriate means such as bonding or cementing of the areas where the two members meet. The rigid base member 21 may preferably be fabricated of metal and has an internally threaded aperture 22 to receive the pointed member 23 which is also threaded to be engageable within the aperture 22. As is clearly shown from the cross-sectional view of FIGURE 3, the member 23 has an area which is grooved or fluted from top to bottom of the threaded surface at 23a so as to provide communication with the underside of the vacuum cup 20. In this manner appropriate evacuating means may be connected to the aperture 22 by a screw type fitting secured to the external threads 22a and the grooved or fluted portions 23a of the pointed member 23 permit the evacuation of the underside of the vacuum cup 20 so as to create a suction with the effect that atmospheric pressure will push up upon sheet material such as that shown at 24 and permit the sheet material to be moved upwardly, laterally and downwardly to be released in any location as desired. It will be noted that the resilient vacuum cup 20 is so configured on its underside as to include a series of ribbed portions shown generally at 25, 26 and 27. These rib configurations contribute to the holding and retention capability of the device and usually take the form of concentric circular ribs.

In accordance with the concept of the present invention, the device operates by placing the resilient cup member on the material to be moved or transferred. A suitable evacuating means is connected to the aperture 22 so that the sheet of material such as that shown at 24 under the resilient cup 20 is urged toward the evacuated space under the resilient cup 20 by the force of atmospheric pressure exerted underneath the sheet of material 24. As the underside of the resilient cup 20 is evacuated and atmospheric pressure is exerted on the underneath side of the sheet of material 24, the resilient cup 20 tends to be pressed and spread against the top surface of the sheet of material 24 so that the ribbed portions 25, 26 and 27 of its underside come into contact with the top surface of the sheet of material 24 thereby aiding the contact with and retention of the sheet of material 24. At the same time, the point of member 23 comes into engagement with the top surface of the sheet of material 24 and the sheet of material 24 follows the movement of the sheet materials handling device through lifting and other movements. When the materials handling device is moved laterally, and particularly in rapidly accelerated and decelerated movements, the sheet of material 24 will tend to slide underneath the resilient cup 20 by reason of its inertia. However, the point of the pointed member 23 usually makes a very slight indentation in the surface of the sheet of material being handled and thereby deters and prevents such sidewise slipping of the sheet of material being transferred or moved. The pointed member 23 may in some cases preferably have a sharpened point for handling hard materials and in other cases may have a somewhat rounded or blunted point when handling soft materials.

Within the concept of the present invention the sharpness of the point of the pointed member 23 may be varied considerably in accordance with the size, type, weight and hardness of the materials to be handled as well as the smoothness of the surfaces upon which the vacuum will be exerted and depending in some degree upon whether or not the surfaces of the materials have a coating such as an oil film. When handling and transferring lightweight materials, a somewhat rounded or blunt pointed member may be employed with good results. Where such materials are flexible, it will be found that the pointed member such as that shown at 23 in FIGURE 2 will tend to deflect the material rather than indent it. Nonetheless the pointed member will perform its proper function in preventing slipping of the material while being transferred or moved, particularly in lateral movements. By contrast, when the sheet materials handling device of the present invention is employed with hard, stiff materials of considerable weight, it has been found that a sharper pointed member such as that shown at 23 in FIGURE 2 is preferably employed. As was previously mentioned, under such conditions the pointed member 23 may slightly indent the upper surface of each sheet of material as it is engaged by the resilient vacuum cup 20 under the force of pressure resulting from the difference between the partial vacuum created under the resilient cup 20 and atmospheric pressure pushing upwardly on the underside of the sheet of material 24 as well as downwardly upon the top of the resilient cup 20. In moving, transferring and handling sheet materials of varying qualities of weight, thickness, type of surface and hardness, it has been found that the pointed member of the present invention when properly positioned for correct engagement with the sheet materials to be handled and shaped to have a point in accordance with the qualities of the sheet material to be handled, will perform its function without troublesome slippage or loss of vacuum due to the sheet material sliding sidewise because of its inertia with respect to the materials handling device under rapidly accelerating or decelerating lateral movements.

Figure 4:
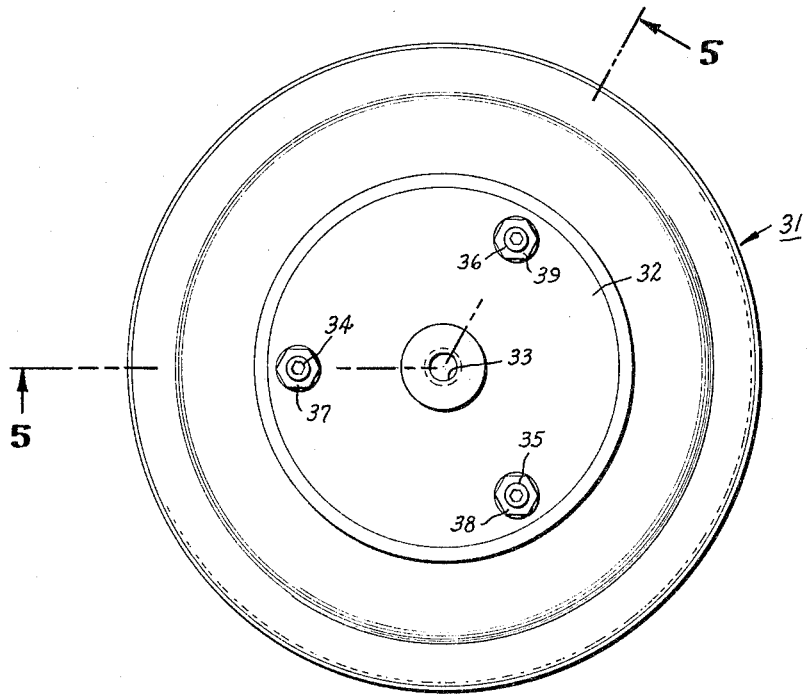
FIGURE 4 is a plan view of another embodiment of the present invention.
Figure 5:
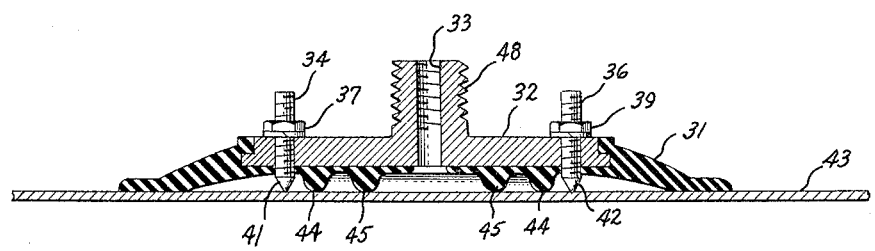
FIGURE 5 is a sectional view of the illustration of FIGURE 4 taken through section 5—5 of the illustration of FIGURE 4.

Referring now to FIGURE 4 there is shown in a plan view of another embodiment of the present invention. This embodiment of the present invention comprises a rigid base member 32 concentrically arranged and secured to a resilient cup member 31, the rigid base member 32 having an aperture therein 33 which is threaded and adapted to be connected to suitable evacuating means. A plurality of pointed members 34, 35 and 36 are supported by the rigid base member 32 at a common radial distance from the central aperture 33 and are positioned equidistant from each other. The pointed members 34, 35 and 36 are threaded and are received and supported in the rigid base member 32 for adjustment upwardly and downwardly as desired with lock nuts 37, 38 and 39 being provided to secure and fix the desired adjustment. The illustration of FIGURE 5 is a view taken through section 5—5 of FIGURE 4 and illustrates the manner in which the pointed members 34, 35 and 36 are threadedly received in the base member 32. As may be seen from FIGURE 5, the rigid base member 32 is secured to a resilient cup member 31 by bonding, cementing or other suitable means between the surfaces where the two members meet and the aperture 33 extends through both the base member 32 and the resilient cup member 31. Accordingly, when the sheet materials handling device of FIGURE 5 is placed upon a piece of sheet material such as that shown at 43, suitable vacuum means connected to the aperture 33 by means to the external threads 48, draws a partial vacuum on the underside of the resilient vacuum cup 31, depressing the device and bringing the ribbed portions 44 and 45 of the underside of the resilient cup 31 into contact with the top surface of the sheet material 43. At the same time, the points 41 and 42 of the pointed members 34 and 36, respectively, as well as the pointed member 35, engage the upper surface of the sheet material 43 and the material is lifted and transferred as desired. However, the three pointed members 34, 35 and 36 such as shown in FIGURE 4, disposed at a common radial distance about the center of the sheet materials handling device and equidistant from each other, effectively prevent slippage or loss of vacuum by movement in any lateral direction due to rapidly accelerating or decelerating movements.

As may be seen from FIGURE 5 the pointed members 34 and 36 are threaded into engagement with the rigid base member 32 whereby the pointed members may be adjusted upwardly or downwardly so as to make the proper and desired engagement with the sheet material to be moved in accordance with the type, weight, size and surface of such material. Upon the proper adjustment of the pointed members 34, 35 and 36 the lock nuts 37, 38 and 39 are used to lock and fix the pointed members in the desired position. As will be appreciated by those skilled in the art, the three pointed members of the embodiment of the present invention shown in FIGURES 4 and 5 provide a positive and secure engagement of one or more of the points of the pointed members regardless of the disposition or lack of balance of the sheet material being handled and thereby insure against unwanted sidewise or lateral slippage of the material while being transferred from one position to another.

Figure 6:
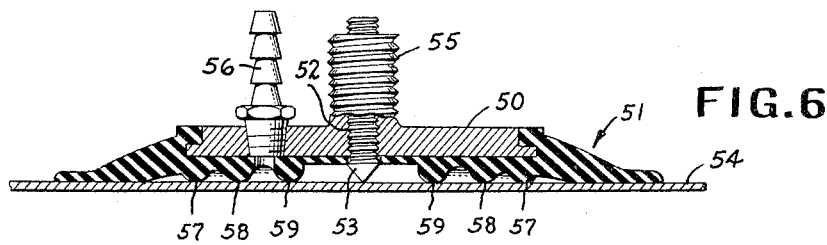
FIGURE 6 is a cross-sectional view of a variant form of the present invention.

The embodiment of the present invention illustrated in FIGURES 2 and 3 is simple, relatively inexpensive and effective to obviate some of the more undesirable disadvantages of prior art devices, while the embodiment illustrated in FIGURES 4 and 5 performs its function within the same concept but is especially adaptable to particular materials handling operations. FIGURE 6 illustrates another variant form of the present invention comprising a rigid base member 50 having a resilient cup 51 affixed thereto in concentric relationship. The rigid base member 50 has an internally threaded aperture 52 adapted to receive and selectively position a pointed depending member 53 to engage the sheet material to be handled such as that shown at 54. The rigid base member 50 may also be threaded on the outside of an extending central portion as shown at 55 to attach to the lifting and moving member of a materials handling apparatus. The rigid base member 50 is threaded at a position radially displaced from the central aperture 52 to receive a connector 56 for connection to suitably evacuating means to actuate the device. The under surface of the resilient cup 51 is provided with a plurality of concentrically disposed ribs 57, 58 and 59 to enhance its gripping capability and increase the amount of surface in contact with the material being handled. The operation of the embodiment of FIGURE 6 is the same in principle as that of the other forms of the invention disclosed and described, the underside of the resilient cup 51 is being evacuated by suitable means connected to the connector 56 and the pointed member 53 being positioned to engage the material to be handled in accordance with its flexibility, hardness, and type of surface as has been previously explained.

While I have disclosed only certain embodiments of the invention, it will be readily appreciated that many modifications thereof may be made. I therefore intend by the appended claims to cover all such modifications as fall within the true spirit and scope of the invention. What I claim as new and desire to secure by Letters Patent of the United States is:

1. A sheet materials handling device comprising a resilient cup member, an aperture in said cup, means adapted to connect said aperture to evacuating means, and at least one pointed member rigidly depending from within said cup, each said member being disposed for its point to engage sheet material held to said cup by its evacuation.

2. A sheet materials handling device comprising a resilient cup member, an aperture in said cup, means adapted to connect said aperture to evacuating means, and a pointed member rigidly supported in said aperture, said pointed member having an orifice therethrough and being disposed for its point to engage sheet material held to said cup by its evacuation.

3. A sheet materials handling device comprising a rigid base member, a resilient cup secured to said base member, an aperture through said base member and said cup, means adapted to connected said aperture to evacuating means, and at least one rigid pointed member supported by said base member and depending from within said cup, each said pointed member being disposed for its point to engage sheet material held to said cup by its evacuation.

4. A sheet materials handling device comprising a rigid base member, a resilient cup secured to said base member, a central aperture through said base member and said cup, means adapted to connect said aperture to evacuating means, and at least one rigid pointed member supported by said base member between said aperture and the outer edge of said cup, each said pointed member depending from within said cup and being disposed for its point to engage sheet material held to said cup by its evacuation.

5. A sheet materials handling device comprising a rigid base member, a resilient cup secured to said base member, a central aperture through said base member and said cup, means adapted to connect said aperture to evacuating means, and a pointed member supported by said base member in said aperture, said pointed member having at least one orifice therethrough and being disposed for its point to engage sheet material held to said cup by is evacuation.

6. A sheet materials handling device comprising a rigid base member, a resilient cup secured to said base member, a central aperture through said base member and said cup, means adapted to connect said aperture to evacuating means, and a pointed member supported by said base member in said aperture, said pointed member having at least one orifice therethrough and being adjustably positionable for its point to engage sheet material held by said cup by its evacuation.

7. A sheet materials handling device comprising a rigid base member, a resilient cup secured to said base member, an aperture through said base member and said cup, said aperture through said base being threaded, and a pointed member having threads adapted to engage said threaded base aperture and at least one portion of its threaded surface grooved from top to bottom, said pointed member being threadedly engaged in said base aperture and disposed for its point to engage sheet material held to said cup by its evacuation.

8. A sheet materials handling device comprising a rigid base member, a resilient cup secured to said base member, a central aperture through said base member and said cup, means adapted to connect said aperture to evacuating means, and a plurality of rigid pointed members supported by said base member between said aperture and the outer edge of said cup, each said pointed member depending from within said cup and being disposed for its point to engage sheet material held to said cup by its evacuation.

9. A sheet materials handling device comprising a rigid base member, a resilient cup secured to said base member, a central aperture through said base member and said cup, means adapted to connect said aperture to evacuating means, and three rigid pointed members supported by said base member at a common radial distance between said central aperture and the outer edge of said cup and equidistant from each other, each said pointed member depending from within said cup and being disposed for its point to engage sheet material held to said cup by its evacuation.

10. A sheet materials handling device comprising a rigid base member, a resilient cup secured to said base member, a central aperture through said base member and said cup, means adapted to connect said aperture to evacuating means, and three rigid pointed members supported by said base member at a common radial distance between said central aperture and the outer edge of said cup and equidistant from each other, each said pointed member depending from within said cup and being adjustably positionable for its point to engage sheet material held to said cup by its evacuation.

11. A sheet materials handling device comprising a circular base member, a larger diameter circular resilient cup concentrically secured to said base member, a central concentric aperture through said base member and said cup, means adapted to connect said aperture of evacuating means, and three rigid pointed members supported by said base at a common radial distance from said central aperture and equidistant from each other, each said pointed member depending from within said cup and being adjustably positionable for its point to engage sheet material held to said cup by its evacuation.

References Cited by the Examiner

UNITED STATES PATENTS 3,084,928   4/1963   Opitz _____ 294—64 X
3,152,828   10/1964  Lytle _____ 294—64

GERALD M. FORLENZA, Primary Examiner.

G. F. ABRAHAM, Assistant Examiner.